United States Patent [19]

Booth et al.

[11] Patent Number: 5,173,549

[45] Date of Patent: Dec. 22, 1992

[54] PROCESS FOR SYNTHESIZING EPOXIDIZED POLYSULFIDES

[75] Inventors: David L. Booth; James K. Stowell, both of Crystal Lake, Ill.

[73] Assignee: Morton International, Inc., Chicago, Ill.

[21] Appl. No.: 548,449

[22] Filed: Jul. 5, 1990

Related U.S. Application Data

[63] Continuation of Ser. No. 208,336, Jun. 17, 1988, abandoned.

[51] Int. Cl.$^5$ .................. C08F 283/00; C08F 283/06
[52] U.S. Cl. .................................. 525/537; 505/535
[58] Field of Search ............................. 525/537, 535

[56] References Cited

U.S. PATENT DOCUMENTS

| | | | |
|---|---|---|---|
| 2,731,437 | 1/1956 | Bender et al. | 260/42 |
| 3,640,965 | 2/1972 | Brode et al. | 528/196 |
| 3,980,679 | 9/1976 | Becker | 260/348.6 |
| 4,366,307 | 12/1982 | Singh et al. | 568/44 |
| 4,829,133 | 5/1989 | Hefner, Jr. et al. | 525/523 |

FOREIGN PATENT DOCUMENTS 897744  5/1962  United Kingdom .

OTHER PUBLICATIONS

W. Charmas and W. Podkoscielny, J. Applied. Polym. Sci., 25, 2393-2406 (1980).

Fujisawa et al., "Synthesis of Poly(4-Hydroxy-3,5-Di--t-Butylphenyl Glycidyl Thioether)", *Polymer Letters Ed.*, vol. 12, pp. 557-559 (1974).

*Primary Examiner*—John C. Bleutge
*Assistant Examiner*—Helen F. Lee
*Attorney, Agent, or Firm*—Mark F. LaMarre; Gerald K. White

[57] ABSTRACT

An improved process for reacting a mercaptanterminated aliphatic polysulfide resin with excess epichlorohydrin in the presence of alkali to form an expoxidized polysulfide is disclosed. The reaction takes place in the absence of a solvent such as ethyl alcohol or ether, which will form an inseparable azeotrope with epichlorohydrin and water. The reaction is carried out at a temperature and pressure sufficient to distill away epichlorohydrin and by-product water. The water and epichlorohydrin are separated and the epichlorohydrin is returned to the pot during the reaction. After the reaction is complete, the epichlorohydrin is stripped, leaving an epoxidized polysulfide, by-product sodium chloride, and residual alkali. The epoxidized polysulfide is dissolved in a work-up solvent and filtered to remove sodium chloride and alkali. Then the work-up solvent is stripped, leaving a purified product.

20 Claims, No Drawings

PROCESS FOR SYNTHESIZING EPOXIDIZED POLYSULFIDES

This application is a continuation of Ser. No. 07/208,336, filed Jun. 17, 1988, now abandoned.

TECHNICAL FIELD

The present invention relates to processes for forming an epoxide capped polysulfide resin by reacting a mercaptan terminated aliphatic polysulfide resin with excess epichlorohydrin in the presence of alkali.

BACKGROUND ART

As illustrated in U.S. Pat. No. 2,731,437, issued to Bender, et al. on Jan. 17, 1956, the reaction of one equivalent of a mercaptan terminated polysulfide with one equivalent of epichlorohydrin in the presence of one equivalent of alkali to form an epoxide capped polysulfide is known. This reference teaches that the reaction is exothermic, and should be carried out in the presence of a diluent such as an alcohol or an ether to avoid an excessive rise in temperature. Bender, et al. does not teach removal of water during the reaction. These two deficiencies of the Bender, et al. method make the process impractical because it requires several days to complete.

A reaction somewhat analogous to that of Bender, et al. has previously been used to form epoxide capped aromatic polyphenols. This reaction is illustrated in British Patent Specification 897,744, published May 30, 1962; U.S. Pat. No. 3,980,679, issued to Becker on Sep. 14, 1976; and Fujisawa, "Synthesis of Poly(4-hydroxy-3,5-di-t-butylphenyl glycidyl thioether)", *Polymer Letters Edition*, Vol. 12, pp. 557–559 (1974). This reaction is not entirely the same as the present one, however, for two reasons. First, of course, is the difference between phenols and polysulfides. Second, the phenolic reaction sometimes requires an additional prereaction step before the alkali is added, during which water must be present.

The previously cited British specification suggests removing water from the reaction mixture by azeotropic distillation while alkali is being added to the reaction. The azeotrope is separated into water and epichlorohydrin, and the epichlorohydrin is returned to the reaction mixture. This removal of the water by-product and return of epichlorohydrin reactant tends to drive the reaction to the right. On page 2, lines 54–7, this reference suggests the presence of various solvents in the reaction mixture, such as benzene, toluene, ether, dioxane, acetone, etc. (Reference herein to a "solvent" does not include epichlorohydrin, unless otherwise indicated.) Some of these solvents are water miscible, and others are water immiscible. The reference does not suggest any difficulty in separating the product from the reaction mixture in the event a polar solvent is used.

The Becker patent cited above suggests that the epoxide capping reaction of a phenol requires about 40 hours unless certain tin catalysts are added to the first stage of reaction, before the alkali is added. (See col. 1, line 65 to col. 2, line 56). Example 1 employs xylene and example 4 employs isobutanol as reaction solvents, and no suggestion is made in the reference that the presence of a solvent lengthens the reaction or separation times.

In the Fujisawa reference, the reaction of epichlorohydrin, a phenol, and sodium hydroxide is disclosed to require about 40 hours, in the absence of any solvent for the epichlorohydrin.

The art cited above relating to end-capping phenolic reactants with epoxide groups does not suggest that it is advantageous to avoid polar reaction solvents to shorten the reaction or separation times.

SUMMARY OF THE INVENTION

The present inventors have discovered the reaction of epichlorohydrin (or its epihalohydrin analogs containing other halogens), a polysulfide resin, and an alkali to form a product mixture containing an epoxide capped polysulfide, followed by the separation of the epoxide capped polysulfide from the product mixture, can be completed in a fraction of the time required in the previously cited art. One important aspect of this discovery is that no material capable of forming a phase-inseparable azeotrope with an epihalohydrin under the reaction conditions employed (such as ethyl alcohol or ether) is added to the initial reaction mixture. Instead, all the ingredients are dispersed in excess epihalohydrin during the reaction. The inventors have also found that removal of water during the course of reaction improves the product by allowing the halide salt by-product to be more easily and thoroughly removed.

The resulting product preferably contains less than 1000 ppm (parts per million), preferably less than 200 ppm, and most preferably less than about 40 ppm ionic halide. (All ppm's, percentages, or parts described herein are on a weight basis, unless the contrary is indicated.)

DESCRIPTION OF THE PREFERRED EMBODIMENTS

The polysulfide resins specified herein are most broadly defined as essentially aliphatic compounds having mercaptan terminal groups and at least one polysulfide linkage. The preferred polysulfide resins are polymers of bis-(ethylene oxy)methane containing disulfide linkages. The polysulfide resins of commerce have the structure:

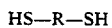

HS—R—SH in which R is the radical identified on col. 2, lines 2 and 3 of the previously cited Bender patent. The preferred polysulfide resins for use herein are the liquid polysulfides sold under the trademark "LP®" by Morton Thiokol, Inc. through its Morton Chemical Division, Chicago, Ill. Use of LP®-3 liquid polysulfide resin is specifically contemplated herein.

An "epihalohydrin" is defined herein as α-epichlorohydrin or its analogs containing a different halogen atom. At least epichlorohydrin, epibromohydrin, epiiodohydrin, and mixtures thereof are known. Of those, epichlorohydrin is most commonly used, and is preferred herein.

The alkali referred to herein can be sodium hydroxide, other hydroxides, or other bases. Sodium hydroxide is readily available and inexpensive, and so is preferred.

While a variety of reaction conditions within the scope of the defined process can be used, the following conditions are preferred.

First, and most critical, the initial reaction mixture of epihalohydrin and polysulfide resin should not be diluted with materials capable of forming phase-inseparable azeotropes with the selected epihalohydrin or a mixture of the selected epihalohydrin and water under the selected reaction conditions, particularly polar solvents such as alcohols and ethers. (For this specification, an azeotrope is considered "phase-inseparable" if it cannot be separated to purify its epihalohydrin constituent by distillation or by allowing it to stand. A "phase separable" azeotrope will separate into an epihalohydrin phase and a water phase upon distillation, or if given a short time to stand and separate.)

Second, water should be removed during the reaction, not only to speed up the reaction, but also so essentially no water remains in the reaction mixture after the reaction is complete and the epihalohydrin is stripped.

The reaction temperature is dictated by the desire to minimize the temperature and the need to conduct the reaction at a temperature high enough to reflux the epihalohydrin and distill away water as a phase separable azeotrope with the epihalohydrin. With the preferred reaction proportions, the temperature is desirably maintained at roughly 60° C., and preferably is never allowed to exceed about 80° C. A higher temperature will increase the rate of condensation polymerization of the epoxide-capped polysulfide resin product, increase the formation of by-products, and increase the amount of hydrolyzable halides present in the product. While sodium hydroxide is being added the reaction is exothermic, and the rate of addition of sodium hydroxide controls the temperature of reaction. Thereafter, the reaction mixture must be heated to maintain reflux.

To reduce the necessary reaction temperature, the reaction pressure is preferably reduced substantially. The initial reaction pressure is from 76 to 127 mm. Hg. After the reaction is complete, a higher vacuum is drawn to strip the volatile constituents, which are mostly excess epihalohydrin and any remaining water.

For each equivalent of polysulfide resin (equivalents being measured in terms of number of mercaptan groups), at least about 3.5 equivalents of the epihalohydrin and more than one equivalent of sodium hydroxide are present at the beginning of the reaction. The preferred ratio of ingredients for use herein is 1 equivalent of polysulfide resin, 3.5 to 4 equivalents of the epihalohydrin, and about 1.1 to 1.3 equivalents of sodium hydroxide. The presence of excess sodium hydroxide and epihalohydrin tends to drive the reaction to the right, ensuring complete reaction of the polysulfide resin.

One important feature of the present invention is that substantially everything but the reaction product and the inorganic solid phase (a halide salt and excess alkali) is stripped from the reaction mixture. Consequently, when the stripped product is dissolved in a work-up solvent to form a work-up solution, there is no aqueous phase to separate. The difficulty in the prior art of separating aqueous and organic phases at this stage is completely eliminated according to the present invention.

The work-up solvent for purifying the epoxidized polysulfide should dissolve the epoxidized polysulfide completely so the work-up solution cannot be separated by filtration or settling, but should not dissolve or stably suspend the halide (typically sodium chloride) by-product or residual alkali from which the reaction product is to be separated. The solvent should also be volatile so it can be removed by vacuum distillation at a moderate temperature. Preferred work-up solvents are toluene and methyl isobutyl keyone (MIBK). Other work-up solvents contemplated for use herein include the following:

Dioxane
Methyl ethyl ketone (MEK)
Methyl propyl ketone (MPK)
Cyclohexanone
Methyl acetate
Ethyl acetate
Butyl acetate
Benzene
Xylene
Carbon tetrachloride
Ethylene dichloride
Ethylene chlorohydrin
Chlorobenzene
Nitromethane
Nitroethane
Nitropropane
Acetone
Diethyl ether Details of the process will be evident from the examples which follow.

EXAMPLE 1

To show the deficiency of the prior art, Example 4 of U.S. Pat. No. 2,731,437 (the "'437 process") was repeated, except that one-fourth of the quantity of each reactant or solvent was used. The quantities of materials and other reaction parameters are shown in Table I in the left column of data. The process was started by mixing LP®-3 polysulfide resin with epichlorohydrin (ECH) and ethyl alcohol and heating the resulting solution to approximately 60° C. Fifty percent aqueous sodium hydroxide was then added dropwise to the reaction. Upon completion of the caustic addition the reaction was maintained at 60°-66° C. for an additional 35 minutes. At this point the ECH and ethyl alcohol were removed from the reaction pot by vacuum distillation (final pressure 25 mm Hg) to a maximum temperature of 70° C. The residue was then dissolved in MIBK and transferred to a separatory funnel. The organic phase was washed with 6 portions of deionized water in order to remove salt and excess caustic. The organic phase was then transferred to a round bottom flask and the MIBK was removed by vacuum distillation (final pressure: 38 mm Hg) to a maximum temperature of 130° C.

As Table I indicates, several significant problems were encountered when following the '437 process.

First, the use of ethyl alcohol as a co-solvent for the epoxidation prevented the recycle of the excess epichlorohydrin distilled from the reaction pot. In order to recycle the ECH, it would be necessary to remove the water contained in the solvent mixture. Since ECH, ethyl alcohol, and water formed a phase-inseparable azeotropic mixture which distilled as a single phase, it was not possible to remove the water by simple distillation or settling. Alternate methods for water removal would result in increased production costs.

Second, major difficulties were encountered during the washing procedure of column 4, lines 25 to 33 of the '437 process. A substantially stable emulsion formed when the solution of the reaction product in MIBK was mixed with water. The mixture had to stand for approximately 2-20 hours after each water wash before the phases separated. (After each wash, the separation time became longer.) Even after prolonged standing the phase separations were not clean. As Table I shows, the total washing time was 54 hours for five washes.

Third, as Table II indicates, the quality of the material prepared by the '437 process was not as good as material made according to the present invention. The ash, chloride and sodium levels of the '437 process material were significantly higher than the values routinely obtained for material prepared by the present process. In addition, the product of the '437 process was hazy.

EXAMPLE 2

The procedure of Example 1 was modified by leaving out the ethyl alcohol solvent, by using slightly more ECH and slightly less caustic, by continuously removing the water of reaction and returning excess ECH to the reaction flask, by using toluene (instead of MIBK) to dissolve and purify the reaction product, and by filtering the solution of the reaction product in a workup solvent to purify it instead of washing an organic phase with water and separating the phases. These differences are summarized in Table I. Minor differences in reaction times and temperatures are also noted in Table I.

A solution of LP ®-3 polysulfide in ECH was placed under a pressure of 114 mm Hg and heated to reflux (approximately 60° C). (LP ® is a registered trademark of Morton Thiokol, Inc. for fluid polysulfide resins.) A 50% aqueous sodium hydroxide solution was then added dropwise to the reaction. During the caustic addition water was continuously removed from the reaction by azeotropic distillation of a mixture of ECH and water, which readily separated into water and ECH phases upon standing. After completing the caustic addition, the azeotropic distillation was continued until the distillate no longer contained a water phase. At this point the excess ECH was removed by vacuum distillation (final pressure: 44 mm Hg to a maximum temperature of 70° C. The residue was then dissolved in toluene and filtered through a DICALITE 4200 flux-calcined diatomaceous earth filtering medium (sold by General Refractories Co., Los Angeles, Calif.) to remove salt and excess caustic. The resulting clear solution was transferred to a round bottom flask and the toluene was removed by vacuum distillation (final pressure 38 mm Hg) to a maximum temperature of 107° C.

As a result of the process improvements described above, the following benefits, recorded in Table I, were achieved by operating according to the present invention. First, since water and ECH do not form an inseparable azeotrope in the absence of ethanol, it was possible to recover 70% of the unreacted epichlorohydrin. This epichlorohydrin can be used in a subsequent epoxidation reaction. Second, the total isolation time was decreased from more than 56 hours to somewhat more than four hours. This represents a time reduction of more than 92.5 percent, and means the reaction and isolation steps can readily be completed in one working shift. Third, Table II shows that the product according to the present invention was superior to the '437 product in several respects. Specifically, the present product had much less ionic chloride, much less chloride by ion chromatography, much less total chloride, and much less sodium than the product of the '437 process.

The weights per epoxide group and molecular weights reported in Table II are primarily useful for comparison between Example 1 and Example 2.

EXAMPLE 3

430 grams of LP ®-3 polysulfide resin were added to 370 grams of epichlorohydrin in a one liter flask fitted with a stirrer, a moisture receiver, a condenser, a thermometer, and an addition funnel. Under full vacuum (a pressure of 25 to 50 mm Hg), 100 grams of 50% aqueous sodium hydroxide were added dropwise, the rate of addition being slow enough to maintain the temperature at about 60° C. After the initial exotherm, the mixture was heated and held at the reduced pressure necessary to maintain reflux at about 60° C. Two hours were consumed adding the sodium hydroxide, during which water was removed from the reaction mixture. After sodium hydroxide addition was complete, this slurry was held at 52° to 54° C. while water continued to be removed for 1.5 hours. The mixture was then stripped under full vacuum at a temperature finally reaching 80° C. to remove epichlorohydrin. To the residual slurry, consisting essentially of epoxidized polysulfide and solid by-products and reactants, 500 milliliters of toluene were added and the resulting slurry was filtered through SPECIAL SPEEDFLOW filter medium (a flux-calcined diatomaceous earth filtering medium sold by General Refractories Co., Los Angeles, Calif.). The toluene was then removed from the filtrate by stripping it under full vacuum to 140° C. The yield was 449 grams, the weight per epoxide unit was 544 grams, ionic chloride was measured at 140 ppm, and the viscosity of the product was 2240 centipoise at 25° C. This viscosity was about 60% higher than the viscosity of the starting polysulfide resin. The weight per epoxide value obtained was very close to the theoretical value of 556.

EXAMPLE 4

This example was run substantially like Example 3, except that the ratio of ingredients was 2800 grams LP ®-3 to 2702 grams epichlorohydrin to 600 grams of 50% aqueous sodium hydroxide. The polysulfide was mixed with epichlorohydrin and cooled in an ice bath before adding sodium hydroxide. Sodium hydroxide was added over 1 hour and 50 minutes, during which the temperature was maintained at no more than 42° C. and water was removed. This temperature was maintained by heating for 3-¼ hours, until no more water could be collected. The epichlorohydrin was then stripped by heating the mixture to 65° C. at reflux. The temperature was regulated by controlling the degree of vacuum. 1500 milliliters of toluene were added and the resulting slurry was filtered through a SPECIAL SPEEDFLOW filtration medium, followed by stripping toluene under vacuum up to 100° C. 3035 grams of product were recovered, as were 371 grams of water and 1417 grams of residual epichlorohydrin. The weight per epoxide group was 544 grams, and the viscosity was 1200 centipoise at 25° C.

EXAMPLE 5

Example 4 was repeated on a larger scale, using 21,196 grams of LP ®-3 fluid polysulfide resin, 16,286 grams of epichlorohydrin, and 4542 grams of 50% by weight aqueous sodium hydroxide. The reaction mixture was initially heated to approximately 55° C. before beginning sodium hydroxide addition, and cooling water was applied during addition of sodium hydroxide. The sodium hydroxide addition required approximately four hours, and a reflux rate of 100 to 200 milliliters per minute or more at 55°-60° C. was maintained by regulating the degree of vacuum. ECH was then stripped at full vacuum to a final temperature of 65° C. 11,355 milliliters of toluene were used as a work-up solvent. The toluene solution of the product was decanted from the salt and excess caustic and filtered through a SPECIAL SPEEDFLOW filtration medium to remove any residual fine salt particles. Otherwise, the procedure of Example 4 was followed. The analysis was as stated in Table III.

EXAMPLE 6

The reactants and conditions specified in Table IV were used as before to produce an epoxidized liquid polysulfide. The process times and product properties are also found in Table IV. A larger volume of toluene was used to work up the product. A very high yield, 99.8%, was achieved.

EXAMPLES 7-14

The reactions of the previous examples are carried out using different polysulfide resins, which differ primarily in molecular weight and proportion of pendant mercaptan groups, and in some cases using different work-up solvents, different ratios of epichlorohydrin to mercaptan groups, or epibromohydrin or epiiodohydrin. Some representative reaction conditions are summarized in Table V. When polysulfides of molecular weight greater than 1000 are epoxidized, a higher ECH/SH mole ratio is required to maintain a stirrable reaction mixture, and a solvent other than toluene is required to dissolve the product. Results comparable to those obtained previously are obtained.

TABLE I

| REACTION PARAMETERS | Example 1 (Prior Art) | Example 2 (Invention) |
|---|---|---|
| RAW MATERIALS | | |
| LP ®-3 fluid polysulfide | | |
| Weight (g) | 500.0 | 500.0 |
| Mole | 0.50 | 0.50 |
| Epichlorohydrin (ECH) | | |
| Weight (g) | 277.5 | 323.8 |
| Moles | 3.00 | 3.50 |
| Mole Ratio (ECH/SH) | 3.00 | 3.50 |
| Caustic (50%) | | |
| Weight (g) | 102.5 | 92.0 |
| Moles | 1.28 | 1.15 |
| Mole Ratio (NaOH/SH) | 1.28 | 1.15 |
| Solvents | | |
| Ethyl Alcohol (g) | 150.0 | 0.0 |
| Methyl Isobutyl Ketone (g) | 750.0 | 0.0 |
| Toluene (g) | 0.0 | 317.0 |
| REACTION PARAMETERS | | |
| Reaction Stage | | |
| Caustic Addition Time (hr) | 3.13 | 2.32 |
| Hold Period (hr) | 0.58 | 1.27 |
| Distillation Period (hr) | 1.30 | 1.03 |
| Total Time (hr) | 5.01 | 4.62 |
| Reaction Temp (°C.) | 59–66 | 59–69 |
| Distillation Temp - Max (°C.) | 75 | 75 |
| Isolation Stage | | |
| Wash Time (hr) | >54 | 0.00 |
| Filtration Time (hr) | 0.00 | 2.00 |
| Distillation Time (hr) | 2.65 | 2.20 |
| Total Time (hr) | >56 | 4.20 |
| Distillation Temp - Max (°C.) | 130 | 107 |
| Yield (%) | 98.5 | 93.9 |
| ECH Recovered (%) | N.A. | 70.7 |

TABLE II

| ANALYTICAL DATA | Example 1 (Prior Art) | Example 2 (Invention) |
|---|---|---|
| Ash (ppm) | 238 | 18.8 |
| Chlorides | | |
| Ionic (ppm) | 63 | 30 |
| Ion Chromatography[1] (ppm) | 193 | 8 |
| Total[2] (ppm) | 1876 | 535 |
| Color (Gardner) | 9 | 9 |
| Mercaptan Content (%) | 0.004 | 0.007 |
| Molecular Weight[3] | | |
| $M_w$ | 2440 | 2950 |
| $M_n$ | 1100 | 1220 |
| MWD | 2.2 | 2.4 |
| Residual Ech (%) | <0.05 | N.D. |
| Residual Solvent (%) | <0.1 | <0.1 |
| Sodium (ppm) | 75.7 | 0.7 |
| Specific Gravity (25° C.) | 1.267 | 1.27 |
| Sulfur Content (%) | 33.1 | 33.6 |
| Viscosity (25° C., cp) | 1750 | 2280 |
| WPE[4] | 622 | 605 |

[1] Determined following Schoeniger flask combustion.
[2] Determined by Schoeniger combustion.
[3] (vs. Polystyrene standard)
[4] Weight of product (grams) per equivalent of epoxide

TABLE III

| ANALYTICAL DATA | |
|---|---|
| Specific Gravity (25° C.) | 1.255 |
| Viscosity, Centipoise (25° C.) | 2138 |
| Weight Per Equivalent of Epoxide (g) | 581.3 |
| Color (Gardner) | 8 |
| Molecular Weights (vs Polystyrene): | |
| $M_w$ | 2710 |
| $M_n$ | 1030 |
| MWD | 2.64 |
| Wt. % less than 1000 | 23% |
| Wt. % less than 500 | 12% |
| Total Sulfur (wt %) | 33.7 |
| Ionic Chloride (ppm by weight) | 39.4 |
| Residual Epichlorohydrin (ppm) | 215 |
| Residual Toluene (ppm) | 1940 |
| Residual Sodium (ppm) | 6 |
| Mercaptan Content (wt. %) | <.007 |

TABLE IV

| RAW MATERIALS | |
|---|---|
| LP ®-3 fluid polysulfide | |
| Weight (g) | 500.0 |
| Mole | 0.50 |
| Epichlorohydrin (ECH) | |
| Weight (g) | 323.8 |
| Moles | 3.50 |
| Mole Ratio (ECH/SH) | 3.50 |
| Caustic (50%) | |
| Weight (g) | 92.0 |
| Moles | 1.15 |
| Mole Ratio (NaOH/SH) | 1.15 |
| Toluene (g) work-up Solvent | >1000 |
| REACTION PARAMETERS | |
| Reaction Stage | |
| Caustic Addition Time (hr) | 2.08 |
| Hold Period (hr) | 1.10 |
| Distillation Period (hr) | 1.05 |
| Total Time (hr) | 4.23 |
| Reaction Temp (°C.) | 58–68 |
| Distillation Temp - Max (°C.) | 75 |
| Isolation Stage | |
| Filtration Time (hr) | 1.12 |
| Distillation Time (hr) | 5.79 |
| Total Time (hr) | 6.91 |
| Distillation Temp - Max (°C.) | 103 |
| Yield (%) | 99.8 |
| ECH Recovered (%) | 83.3 |
| ANALYSIS OF PRODUCT | |
| Chloride, Ionic (ppm) | 19 |
| Molecular Weight (vs. Polystyrene Std.) | |
| $M_w$ | 3100 |
| $M_n$ | 1600 |
| MWD | 1.9 |

TABLE IV-continued

| Viscosity, Centipoise (25° C.) | 2514 |
| --- | --- |

TABLE V

| POLYSULFIDE | (Mol. Wt.) | Scale[5] (liters) | Mole Ratio (ECH/SH) | Work-up Solvent |
| --- | --- | --- | --- | --- |
| LP ®-2 | 4,000 | 38 | 20.25 | MEK |
| LP ®-31 | 8,000 | 2 | 50.00 | MEK |
| LP ®-32 | 4,000 | 12 | 15.84 | MEK |
| LP ®-33 | 1,000 | 5 | 3.98 | toluene |
| LP ®-33 | 1,000 | 12 | 3.96 | toluene |
| LP ® 58 S | 4,000 | 1 | 10.00 | toluene |
| LP ® 541 | 4,000 | 5 | 14.20 | MEK |
| LP ® 1400 | 1,000 | 5 | 3.98 | toluene |

[5]Scale is the size of the reaction vessel

We claim:

1. A process for forming an epoxide capped polysulfide resin, comprising the steps of:
   A. reacting at a controlled temperature a polysulfide resin having mercaptan terminal groups and at least one polysulfide linkage with an excess of an epihalohydrin, controlling the reaction temperature by the sequential addition of an alkali to form a product mixture comprising an epoxide capped polysulfide resin, water, and a halide salt; and
   B. removing said water from said product mixture during said reacting step A;
   wherein said process is carried out in the absence of a solvent capable of forming an inseparable azeotrope with materials selected from the group consisting of an epihalohydrin and a mixture of an epihalohydrin and water.

2. The process of claim 1, comprising the further step of isolating said epoxide capped polysulfide resin from said product mixture.

3. The process of claim 2, wherein said isolating step includes the step of stripping said excess epihalohydrin from said product mixture.

4. The process of claim 2, wherein said isolating step includes the steps of:
   A. dissolving said product mixture in a work-up solvent which dissolves said epoxide capped polysulfide resin and does not dissolve said halide salt, thereby forming a work-up solution; and
   B. separating said halide salt from said work-up solution.

5. The process of claim 4, comprising the further step of stripping said work-up solvent from said work-up solution.

6. The process of claim 4, wherein said separating step is carried out by filtering said work-up solution.

7. The process of claim 4, wherein said isolating step is carried out in the absence of water.

8. The process of claim 4, wherein the product polysulfide of said isolating step contains less than 1000 ppm by weight of ionic halide.

9. The process of claim 4, wherein the product polysulfide of said isolating step contains less than 200 ppm by weight of ionic halide.

10. The process of claim 4, wherein the product polysulfide of said isolating step contains less than 40 ppm by weight of ionic halide.

11. The process of claim 1, wherein said removing step is carried out by distilling an epihalohydrin and water from said product mixture during said reacting step, separating said epihalohydrin from said water, and returning said epihalohydrin to said product mixture.

12. The process of claim 11, wherein said removing step is carried out continuously during said reacting step.

13. The process of claim 1, wherein said epihalohydrin is epichlorohydrin and said halide salt is a chloride.

14. A process for forming an epoxide capped polysulfide resin, comprising the steps of:
   A. reacting at a controlled temperature a polysulfide resin having mercaptan terminal groups and at least one polysulfide linkage with excess epichlorohydrin, controlling the reaction temperature by the sequential addition of an alkali and in the absence of a solvent capable of forming an inseparable azeotrope with materials selected from the group consisting of epichlorohydrin and a mixture of an epichlorohydrin and water;
   B. removing water during said reacting step A;
   C. stripping any remaining water and epichlorohydrin from the product of step B, which product includes epoxide capped polysulfide resin and a chloride salt;
   D. dissolving the product of step C in a work-up solvent which dissolves said epoxide capped polysulfide resin and substantially does not dissolve said chloride salt, thereby forming a work-up solution; and
   E. separating said chloride salt from said work-up solution.

15. The process of claim 14, comprising the further step of stripping said work-up solvent from said work-up solution.

16. The process of claim 14, wherein said separating step is carried out by filtering said work-up solution.

17. The process of claim 14, wherein the product polysulfide of said separating step contains less than 1000 ppm by weight of ionic chloride.

18. The process of claim 14, wherein the product polysulfide of said separating step contains less than 200 ppm by weight of ionic chloride.

19. The process of claim 14, wherein the product polysulfide of said separating step contains less than 40 ppm by weight of ionic chloride.

20. A process for forming an epoxide capped polysulfide resin, comprising the steps of:
   A. reacting at a controlled temperature a polysulfide resin having mercaptan terminal groups and at least one polysulfide linkage with an excess of an epihalohydrin, controlling the reaction temperature by the sequential addition of an alkali to form a product mixture comprising an epoxide capped polysulfide resin, water, and a halide salt; and removing said water from said product mixture during said reaction;
   wherein said process is carried out in the absence of a solvent capable of forming an inseparable azeotrope with materials selected from the group consisting of an epihalohydrin and a mixture of an epihalohydrin and water, said process being carried out at a sufficiently reduced pressure to maintain a temperature during said reaction not to exceed about 80° C.

* * * * *